April 20, 1965

J. BLASS

3,179,935

RANDOM FREQUENCY RADAR SYSTEM

Filed Aug. 9, 1956

INVENTOR
JUDD BLASS
BY
Moses, Nolte, & Nolte
ATTORNEYS

April 20, 1965 J. BLASS 3,179,935
RANDOM FREQUENCY RADAR SYSTEM
Filed Aug. 9, 1956 7 Sheets-Sheet 3

INVENTOR
JUDD BLASS
BY
Moses, Nolte, & Nolte
ATTORNEYS ns3,179,935
RANDOM FREQUENCY RADAR SYSTEM
Judd Blass, Flushing, N.Y., assignor to Maxson Electronics Corporation, a corporation of New York
Filed Aug. 9, 1956, Ser. No. 602,998
14 Claims. (Cl. 343—14)

The present invention relates to radio transmitting and receiving equipment adapted to operate at rapidly changing indeterminate frequencies and, more particularly, to a random frequency radar receiver.

One of the most important countermeasures against radar is jamming and, therefore, an important characteristic of a radar system is its resistance to various types of jamming.

An object of the present invention is to provide a radar system having an extremely high immunity to jamming. The anti-jamming characteristic of the system is achieved by changing the radio frequency of the radar system in a rapid random and discontinuous manner from pulse to pulse.

A second object of the present invention is to provide a receiver capable of tuning itself at a very rapid rate to a non-predetermined frequency.

Another object of the invention is to provide an amplifier which may be tuned to any one of a large number of channels within a given frequency band at an extremely rapid rate although the channels may be selected indiscriminately.

Another object of the invention is to provide a transmitter operating at randomly varying frequencies which change at a very rapid rate, and a receiver for selectively receiving the rapidly varying frequencies.

A further object of the invention is to provide a pulse transmitter operating at a rapidly changing frequency and a receiver, the tuning of which is dialed to the transmitter frequency by dialing pulses generated at the transmitter prior to each transmitted pulse.

A further object of the invention is to provide a receiver which may be dialed to any one of a predetermined number of frequency channels in response to a radio frequency pulse having a frequency within said one channel.

The above and other objects of the invention are attained by providing in the radar transmitter, an oscillator which is frequency sensitive to an applied voltage, and varying said voltage in a random manner from one pulse to the next, while maintaining said random voltage substantially constant for the duration of each pulse. In addition to each transmitted pulse, the transmitter may generate a plurality of low level radio frequency pulses having substantially the same frequency as the transmitted pulse and occurring immediately before the transmitted pulse. These low level pulses, called dialing pulses, are applied to the input of the receiver. The receiver has a plurality of frequency selective stages each consisting of at least two sub-channels having different pass bands. The sub-channels may include amplifiers, an output circuit, and an input circuit. Means are provided for comparing the outputs of the two sub-channels of each stage so as to operatively connect the sub-channel carrying the larger signals and disconnect the other sub-channel from the output circuit of that stage. The sub-channels may comprise filter circuits designed so that each stage has a narrower pass band, than that of the preceeding stage. Each stage is further provided, preferably in its output circuit, with means for converting the output of the pair of sub-channels to a common frequency within the pass band of the next stage. The first dialing pulse may then gate the appropriate sub-channel of at least the first stage. The second dialing pulse will then be transmitted through the selected sub-channel of the first stage to the second stage and operate the gating means which selects the appropriate sub-channel of the second stage. In this manner each of the dialing pulses tunes or gates one of the stages. The last frequency selecting stage of the receiver may be similarly tuned or gated by the transmitted pulse, so that the receiver is tuned to the frequency thereof at the time it is transmitted. After a predetermined time, the gating circuits are released and the receiver is then ready to be tuned to the frequency of the next transmitted pulse.

Another important embodiment of the invention is one in which the dialing pulses are dispensed with and a single pulse from the transmitter is impressed on the receiver to dial all tuned stages of the receiver at once. The single dialing pulse may be the "main bang," and it will be recognized that in that case a remarkably efficient tuning of a receiver to a random frequency is obtained.

The invention will be fully understood from the following description and the drawing in which:

FIG. 9 is a detailed block diagram of the first amplifier stage of the receiver;

Figure 1:
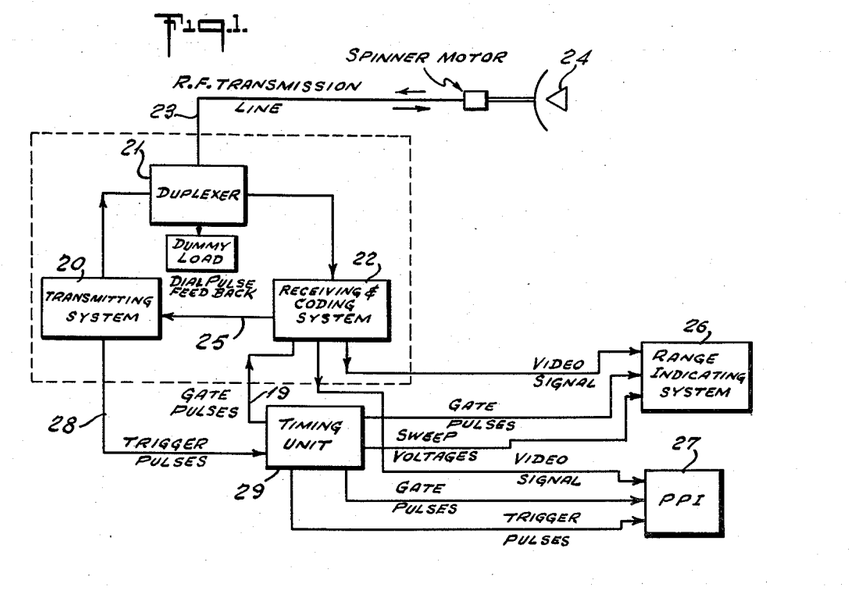
FIG. 1 is a simplified block diagram of a radar system of a type to which the invention applies.

Referring to the drawing, FIG. 1 shows the elements of a radar system. For the sake of simplicity, certain elements of the system which are not necessary for an understanding of the present invention such as an azimuth and elevation reference voltage generator, an antenna positioning system, etc., are omitted from the drawing. The radar system comprises a transmitter 20 connected to a duplexer 21 which is, in turn, connected to a receiver 22 and to a transmission line 23 which extends to an antenna 24. Transmitter 20 is adapted to produce high power radio frequency pulses. In one embodiment the transmitter also produces a plurality of low-level pulses prior to each high power pulse, and this embodiment will be described first. The duplexer 21 is of a type which permits the low-level pulses to be transmitted to the receiver 22, while not permitting the low-level pulses to reach the antenna 24. The duplexer 21 operates in the conventional manner for high-level pulses, supplying them to the antenna 24. Duplexers of this type are known in the art and one such duplexer will be described hereinafter. A feedback connection 25 from the receiver 22 to the transmitter 20 feeds the last dial pulse back to the transmitter for a purpose which will be explained fully hereinafter. The video signal output of receiver 22 is supplied to suitable indicating instruments, such as a range indicating system 26 and a PPI display unit 27. Triggering pulses are supplied from the transmitter 20 over a connection 28 to a timing unit 29 which provides gate pulses to the receiver 22, the range indicating system 26 and the PPI unit 27. Timing unit 29 also supplies pulses over lead 19 to receiving and coding system 22 for releasing the coder thereof after each coding or tuning operation. It will be understood that the radar system includes various other devices which are not shown in FIG. 1.

Figure 2:
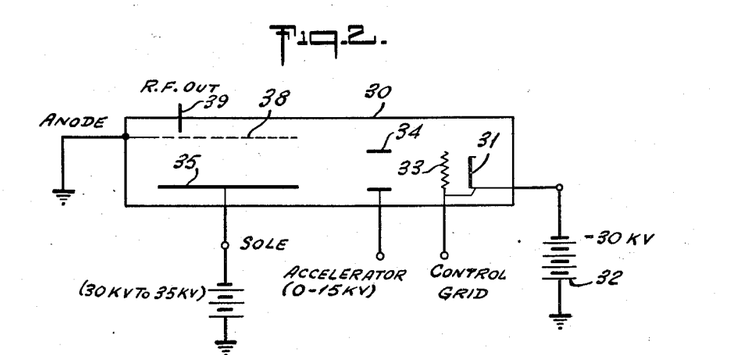
FIG. 2 is a schematic diagram of an oscillating tube which may be used in the present invention.

In view of the fact that it is necessary to vary the frequency of the transmitter at a rapid rate, a voltage sensitive oscillator is used and one oscillator tube of this type is the Carcinotron 30 shown in FIG. 2. This tube comprises a cathode 31 adapted to be connected to the negative terminal of a voltage source 32, a control grid 33 and an accelerator electrode 34. The accelerator electrode may be connected, for example, to a variable voltage source having a maximum voltage of 15,000 volts. The power output of the Carcinotron is determined by the voltage on accelerator electrode 34. The tube also includes a "SOLE" electrode 35 which, for example, may be maintained at 30,000 to 35,000 volts negative with respect to ground. The oscillating frequency of the tube is controlled by the voltage on the SOLE electrode 35. An anode 38 is maintained at ground potential while the radio frequency output of the tube is extracted by an electrode 39.

Figure 3:
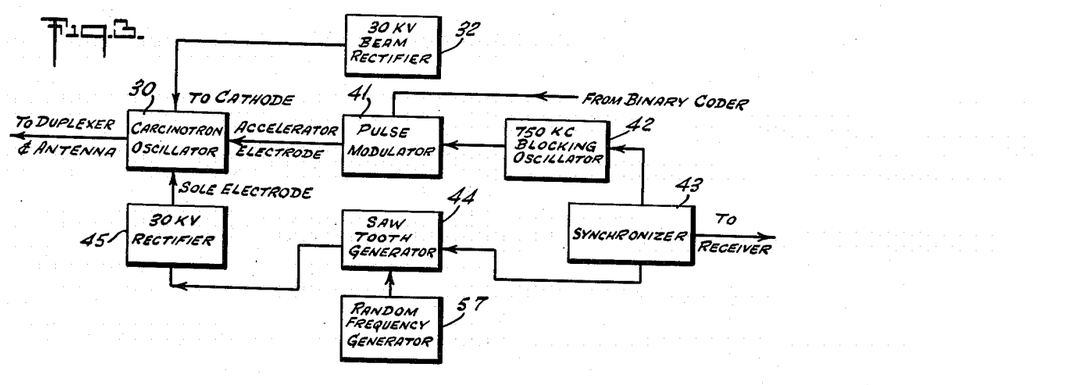
FIG. 3 is a block diagram of the transmitter.

The circuits for supplying the necessary voltages to the Carcinotron oscillator 30 in order to enable it to produce the required high power pulse and the low-level dialing pulses and to vary the frequency of these pulses in a random manner are indicated in FIG. 3. The power supply 32 connected to the cathode of oscillator 30 may be a rectifier having a voltage output of 30 kv., for example. The voltage for the accelerator electrode in the oscillator is supplied by a pulse modulator 41 which is fed by a blocking oscillator 42. The blocking oscillator 42 is controlled by a constant frequency synchronizer 43. The pulses supplied by pulse modulator 41 to the accelerator electrode of the oscillator 30 amplitude modulate the oscillator. By varying the amplitude of the pulses impressed by pulse modulator 41 on the accelerator electrode of the oscillator 30, the output thereof may be controlled so as to permit it to generate pulses of the maximum power rating of the oscillator or low level pulses for dialing purposes.

Figure 4:
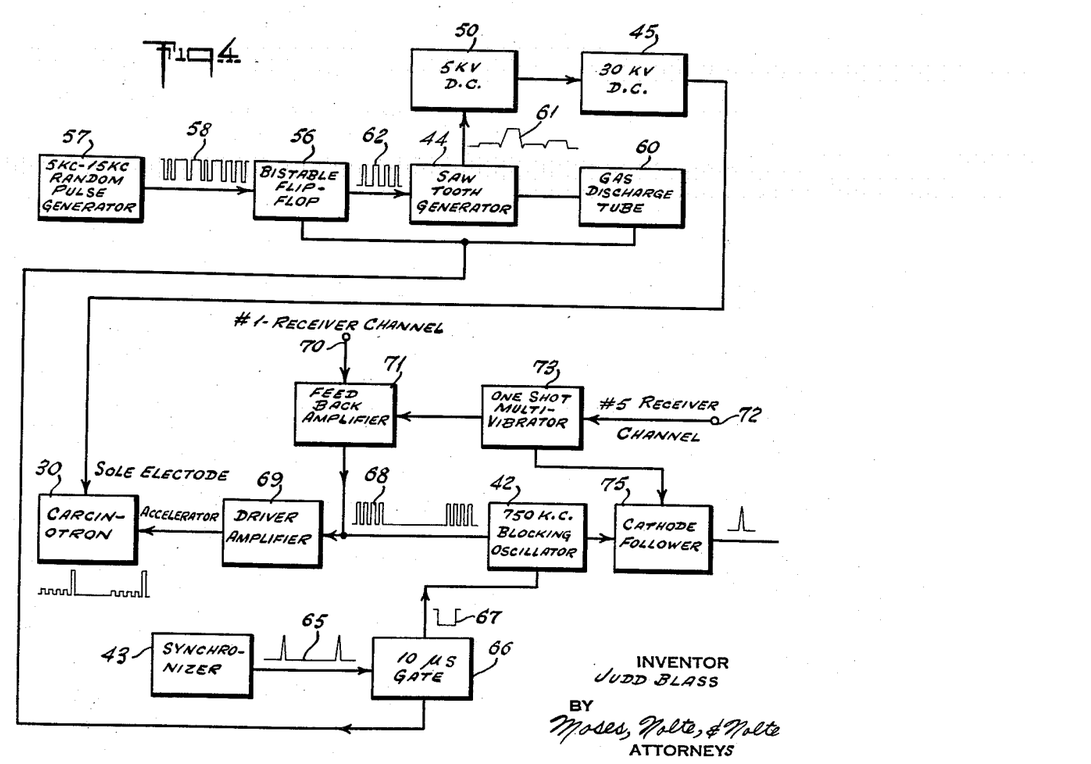
FIG. 4 is a block diagram of a pulse modulator.

The randomly varying modulation on the SOLE electrode 35 is produced by a saw-tooth generator 44 and a low power rectifier 45 which may have a voltage output of 30 kv. The SOLE electrode voltage, which causes a random change in frequency from pulse to pulse, must be maintained substantially constant during the interval required for a single transmission. This interval includes the period of the five dial pulses which are not radiated but which select the correct receiver channel. In order to maintain the frequency of the oscillator substantially constant during a transmission period, it has been found that the modulation voltage on the SOLE electrode should not vary more than 1 part in 3,000. In order to meet this constancy requirement, a voltage modulator of the type shown in FIG. 4 is used. The voltage on the SOLE electrode is derived from the 30 kv. D.C. source 45 and a 5 kv. D.C. source 50 connected in series. The 30 kv. source 45 is a very low-power constant-voltage source having its negative terminal connected to the SOLE electrode. The source 50 is connected to the saw-tooth generator 44 in the manner shown in FIG. 5. The positive terminal of the source 45 is connected to the negative terminal of the source 50. The sawtooth generator 44 is a parallel RC circuit comprising a resistor 51 and a condenser 52. The charging time constant of circuit 44 may be of the order of one-fifth of the radar period, for example 100 microseconds, while its discharging time constant is of the order of 10 milliseconds. The saw-tooth generator 44 is connected through the voltage source 50 and a resistor 53 to a charging tube 54. The control grid 55 of charging tube 54 receives a pulse from a bi-stable flip-flop circuit 56. The flip-flop circuit 56 is connected to a pulse generator 57 adapted to supply pulses of a random frequency, varying, for example, from 5 kc. to 15 kc. Pulse generator 57 supplies random pulses of the form shown at 58 to the bi-stable flip-flop circuit 56. The latter is also provided with positive pulses from a gate circuit 66. These gate pulses occur at pulse repetition frequency of the transmitted pulses and in synchronism therewith. The circuit is so arranged that a positive pulse at the input to the flip-flop circuit 56 results in a positive D.C. voltage at its output. The positive pulses from flip-flop circuit 56 cause charging tube 54 to begin charging RC circuit 44. The charging of circuit 44 continues until a negative pulse 58 triggers flip-flop circuit 56 and causes it to cut off charging tube 54. As a result, the voltage across RC circuit 44 may have any value between zero volts and the voltage of source 50, which in the present example, is 5000 volts.

Figure 5:
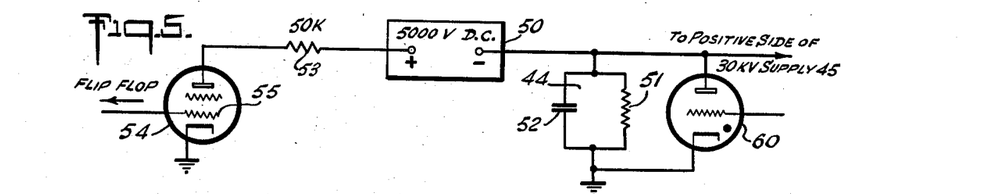
FIG. 5 is a circuit diagram of the saw-tooth generator of the random voltage modulator.

The voltage applied to the SOLE electrode of the oscillator is, therefore, equal to the 30,000 volts across the source 45 plus the voltage across the RC circuit 44. The latter voltage has the form shown by the curve 61. This voltage is a flat topped saw-tooth wave which varies in amplitude between zero and 5000 volts. Each of the saw-tooth waves 61 has a charging time determined by the width of the gating pulses 62 applied by the charging tube 54 to the flip-flop circuit 56. This pulse width is a measure of the time between the termination of the transmitted radar pulse and the first negative pulse emitted thereafter by the random frequency pulse generator 57. Upon termination of a pulse 62, the charging tube 54 is cut off and the voltage across the RC circuit 44 is then held until the condenser 52 is discharged by the discharging tube 60. Thus the RC circuit provides a nearly constant voltage from the time that the charging thereof ceases to the time that the next radar pulse has been transmitted. Since the time constant of the RC circuit 44 is 10 milliseconds, the variation in the voltage across it during a 10 microsecond interval will be less than one part in 1000. At the maximum voltage of 5000 volts across the RC circuit, this corresponds to a change of only 5 volts during the time of complete transmission of 5 dial pulses and a radar pulse.

The output of the Carcinotron oscillator is pulsed by applying voltage pulses to the accelerator electrode. The synchronizer 43, which may include a constant frequency oscillator, produces synchronizing pulses 65. These pulses are impressed on a 10 microsecond gate pulse generator 66 which produces substantially rectangular pulses of the form indicated at 67. The pulses 67 of gate generator 66 are supplied to the flip-flop circuit 56 and the gas discharge tube 60 and blocking oscillator 42. The latter may be adjusted to a frequency of say 750 kilocycles per second. Blocking oscillator 42 produces pulses having a duration, say, of 0.5 microsecond. These pulses, indicated at 68, are applied to a driver amplifier 69 connected to the accelerator electrode 34 of the Carcinotron 30. A negative feedback loop from the receiver to the driver amplifier 69 is provided so that the amplifier gain during the generation of the dial pulses will be reduced. The negative feedback is provided by a connection 70 from the receiver input to a feedback amplifier 71. The latter is connected to a control electrode of amplifier 69 to reduce the gain thereof. The feedback loop includes also a connection 72 from the video output of No. 5 channel of the receiver to a one-shot multi-vibrator 73. The multi-vibrator 73 is connected to a control electrode or the screen grid of feedback amplifier 71 to cut off amplifier 71 and thereby open the negative feedback loop. Thus, when the system is ready for the high power transmitter pulse, that is when all the receiver channels but the very last have been selected, the negative feedback loop is opened by the pulse fed back from the No. 5 channel of the receiver. When this occurs, the gain of driver amplifier 69 is a maximum. The last pulse in the series of pulses 68 can then be amplified to the required peak voltage output by amplifier 69. Pulse generator 42 is gated off by gate generator 66 during the interval that the Carcinotron does not oscillate. The pulse from blocking oscillator 42 which initiates the high level transmitter pulse is also impressed on a cathode follower 75 which is gated by the multi-vibrator 73. The output of cathode follower 75 is a timing or trigger pulse 76 which is fed to timing unit 29 and serves to initiate all the sequences on the range and servo system of the radar.

Figure 6:
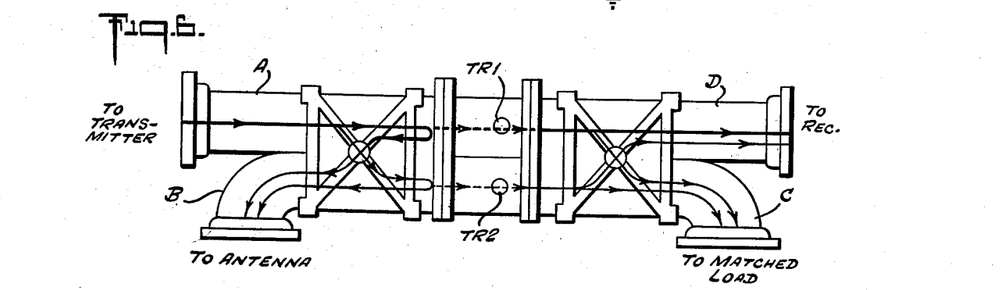
FIG. 6 is a diagram of a duplexer for connecting the transmitter to the receiver and the antenna.

The duplexer 21 is designed so that the low level dialing pulses are not transmitted by the antenna. The duplexer operates in the conventional manner, however, for the high power pulses. A duplexer which can perform these functions is the double hybrid type using two TR tubes rather than a single TR tube and one ATR tube.

A duplexer of this type is schematically illustrated in FIG. 6 and has been described in detail in the article entitled "The Short-Slot Hybrid Junction" by J. H. Riblet in Proc. I.R.E., 1952. Referring to FIG. 6, energy in channel A is diverted into channel B when the TR tubes TR1 and TR2 are ignited. If the TR tubes are not ignited, energy in channel A is coupled to channel C. The transmitter is connected to channel A and the receiver is connected to channel D, while a matched load is connected to channel C, and the antenna is connected to arm B. The isolation between receiver channel D and transmitter channel A is in excess of 25 db. A signal received at B from the antenna will be coupled to the receiver connected to arm D. The dialing pulses have an energy level which is low enough to avoid firing of the TR tubes. Therefore, a portion of the energy of these pulses will be transmitted through the arm D of the duplexer to the receiver. The radar pulse will reach the receiver through the duplexer in a highly attenuated form, but with an amplitude which is sufficient to operate the dialing mechanism of the receiver.

Figure 7:
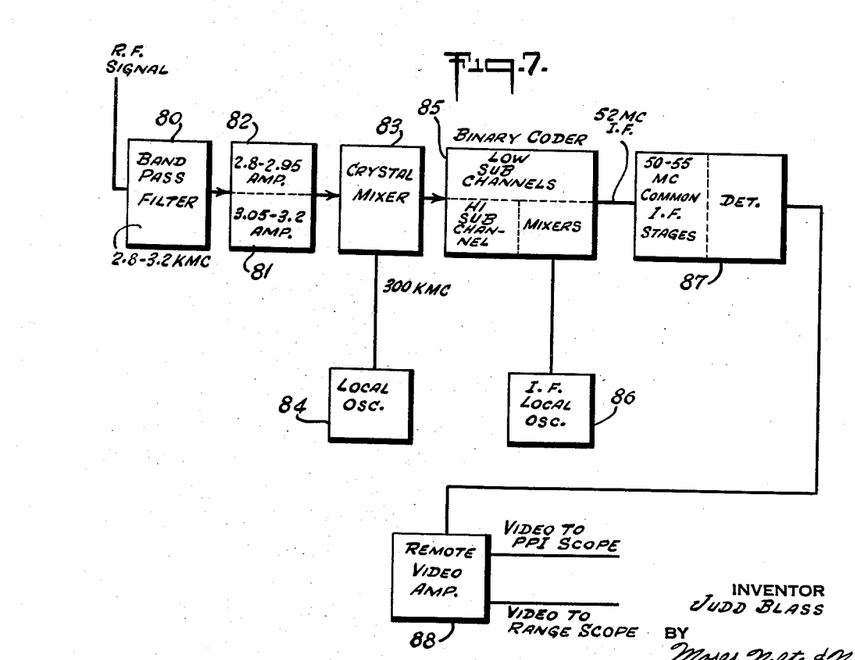
FIG. 7 is a block diagram of the receiver.

The random frequency RF pulses sent out by the transmitter are received by the receiver, which is capable of tracking the random frequency of the transmitter on a pulse to pulse basis. A block diagram of such a receiver is shown in FIG. 7. The RF signal from the duplexer is fed to a band pass filter 80 capable of accepting substantially the entire range of transmitted frequencies, which may be, for example, 2.8 to 3.2 kilo-megacycles. The frequency selecting portion of the receiver may consist of six frequency selective stages connected in cascade. Each stage is divided into two sub-channels, including a low pass filter and a high pass filter. The cross-over of the two filters of each channel is near the center of the frequency band of that channel. Each channel, in addition to the upper and lower band pass filters, may include suitable amplifiers and converters. Thus, the first frequency selective channel of the receiver may include a high pass filter 81 having a pass band of approximately 3.05 to 3.2 kmc. and a low pass filter having a pass band of approximately 2.8–2.95 kmc. The 2.95 kmc. to 3.05 kmc. range is not used. The outputs of filters 81 and 82 are supplied to crystal mixers 83 to which a local oscillator 84 supplies oscillations of a frequency of 3 kmc. The output of the crystal mixers 83 consists of pulses having an I.F. center frequency of 125 mc. The I.F. signals are supplied to a binary coder 85 having a plurality of stages, each comprising a low frequency sub-channel, a high frequency sub-channel, and at least one mixer. The mixers in stages 85 are connected to a plurality of local oscillators 86. The I.F. output of the stages 85 may be a signal of a nominal frequency of 52 megacycles, and this signal is impressed on a video receiver 87 which includes a plurality of I.F. amplifier stages tuned to a frequency band of approximately 50 to 55 megacycles. The video receiver 87 preferably includes also detectors for supplying video signals to a video amplifier 88. The video output of amplifier 88 is then supplied to the PPI 27 and the range unit 26 as well as any other units of the radar system which may require a video signal.

Figure 8:
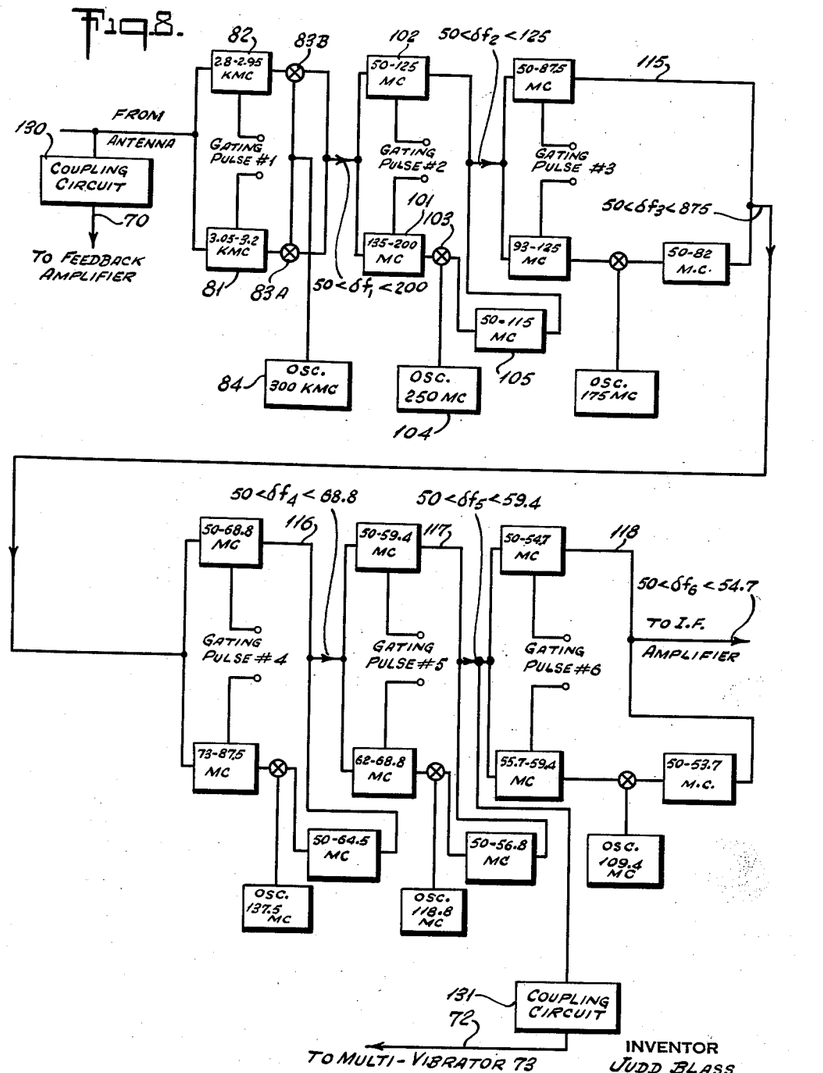
FIG. 8 is a schematic diagram of the selective amplifier stages of the receiver.

The frequency selective portion of the receiver is shown in greater detail in the block diagram of FIG. 8. The first stage of the receiver includes two sub-channels 81 and 82. Sub-channel 81 is tuned to 3.05–3.2 kmc. and may include suitable filters and amplifiers, while subchannel 82 consists of similar components and is tuned to a receiver frequency within the band of 2.8–2.95 kmc. The frequency separation between upper and lower subchannels are combined in crystal mixers 83A and 83B, or mixers of any other suitable type, with a 3.00 kmc. signal from a local oscillator 84. The upper and lower subchannels 81 and 82 of the first frequency selective stage are gated by gating pulses derived from the output of the mixers 83A and 83B. The manner in which the gating is accomplished will be understood from the block diagram of the first frequency selective stage shown in FIG. 9. The high frequency sub-channel 81 consists of a by-pass filter 90 and a gated amplifier 91. Filter 90 has a pass band extending from 3.05 to 3.2 kmc. The low frequency subchannel 82 includes a low pass filter 92 having a pass band extending from 2.8–2.95 kmc. and a gated amplifier 93 connected to the output of the filter. The outputs of amplifiers 91 and 93 are fed to the mixers 83A and 83B and therein are combined with the 3.00 kmc. signals supplied by local oscillator 84. When the first dialing pulse is injected into the receiver, the output of one of the amplifiers 91 or 93 will be much greater than that of the other, since the received signal will be in the pass band of one of these amplifiers and in the rejection band of the other amplifier. Consequently, the output of one of the video detectors 94 or 95 will be greater than the other. The outputs of video detectors 94, 95 are supplied to a differential amplifier and gating generator 96 which impresses gating pulses on the amplifiers 91 and 93 to shut off the amplifier which happens to be in the frequency rejecting sub-channel and permits the sub-channel having the greater signal output to remain in a conductive condition. The gating generator 96 maintains the selected amplifier in the gated condition until the echo pulses are received and then places both amplifiers 91 and 93 in an ungated receiving condition. This action may be accomplished by properly adjusting the time constant of the gating generator and/or supplying it with pulses from timing unit 29 or synchronizer 43 over lead 97. Thus, the amplifier 91 or 93 which remains conductive supplies a signal to one of the mixers 83A or 83B which is then heterodyned by local oscillator 84 to produce a signal having a frequency within the band 50–200 mc. This signal is then supplied to the second channel or frequency selective stage 100 of the receiver, which has a pair of sub-channels 101 and 102 tuned to frequency bands 135–200 mc. and 50–125 mc., respectively. The output of subchannel 101 is impressed on a mixer 103, wherein it is heterodyned by a 250 mc. signal derived from oscillator 104. The output of mixer 103 is supplied to a band pass filter 105 tuned to a frequency of 50–115 mc. The output of filter 105 or the output of sub-channel 102 is then fed to the third frequency selective stage 115 of the receiver. The second frequency selective stage 100 is provided with gating means similar to that of the first stage for gating either the upper sub-channel or the lower sub-channel depending on which produces the stronger signal. The output of the second frequency selective stage is in the frequency band of 50 to 125 mc.

Figure 10:
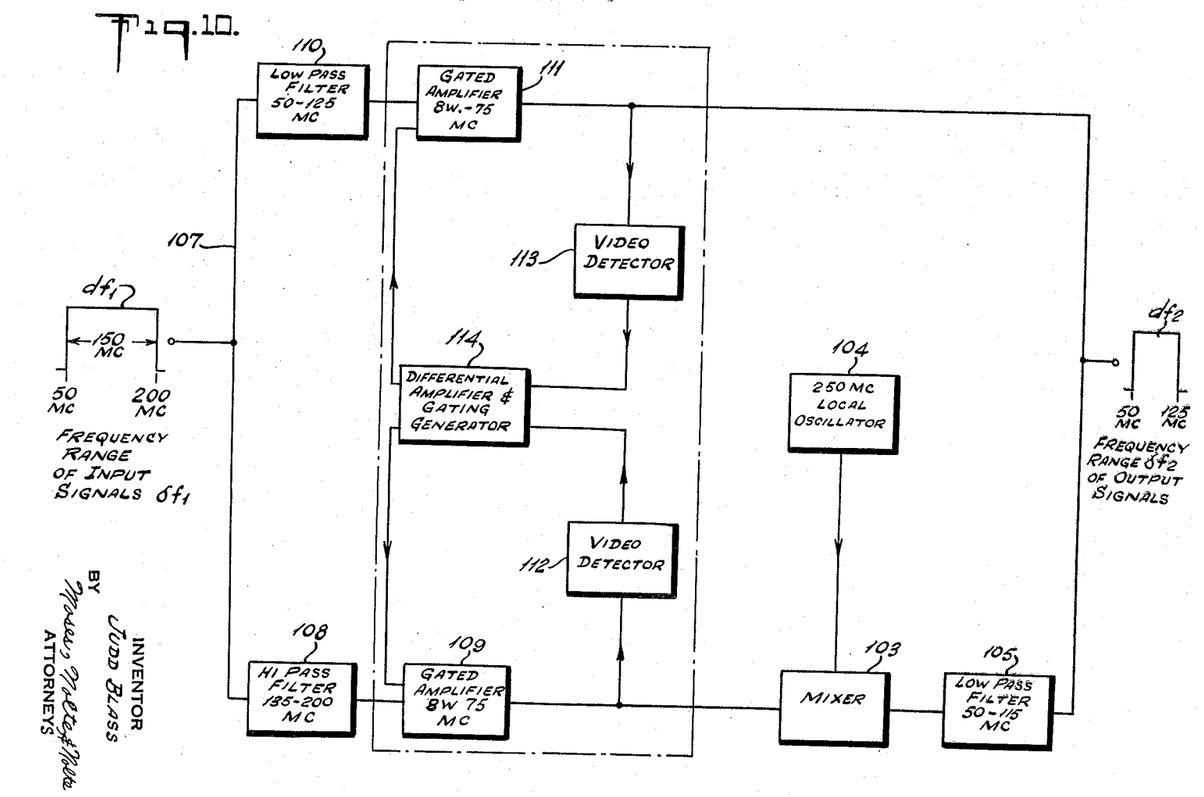
FIG. 10 is a block diagram of another selective amplifier stage of the receiver.

A block diagram showing the second selective stage of the receiver in greater detail is presented in FIG. 10. The output signal $df_1$ of the first frequency selective stage lies within a frequency band of 50–200 mc. This is applied over an input circuit 107 to sub-channels 101 and 102 of stage 100. Sub-channel 101 comprises a filter 108 tuned to 135–200 mc. and an amplifier 109, and sub-channel 102 includes a low pass filter having a pass band of 50–125 mc. and a gated amplifier 111. Amplifiers 109 and 111 are gated by video detectors 112, 113 and a differential amplifier and gating generator 114 in the same manner as the amplifiers 91 and 93 of the first frequency selective stage. The output of amplifier 109 is combined in a mixer 103 with a 250 megacycle signal from local oscillator 104. A filter 105, connected to the output of mixer 103, selects signals therefrom within the frequency band of 50–115 megacycles. It is seen, therefore, that the 150 megacycle frequency band at the input of the second selective stage is eventually reduced to a signal of $df_2$ having a 75 megacycle band at its output. The filters 108, 110 identify into which half of the 150 megacycle band the transmitter frequency falls. The 10 megacycle spacing between filters 108, 110, allows for the crossover of the filter passbands. As in the first frequency selective stage, the difference between the outputs of amplifiers 109 and 111, after being detected by video detectors 112 and 113, respectively, are compared in the differential amplifier 114. The difference between the two outputs is amplified in the correct sense by differential amplifier 114 and the output of the amplifier triggers a gating generator. The output of the gating generator shuts off the weaker sub-channel. After this gating action, the first two channels are correctly tuned for the expected radar echo and the original 300 megacycle frequency range at the input of the receiver, has been narrowed down to a 75 megacycle band at the output of the second frequency selective stage. In order to repeat the process of frequency selection, the frequency at the output of each channel must be independent of the sub-channel through which the signal came. Accordingly, the output of one band pass filter is heterodyned with a suitable fixed frequency local oscillator to shift the frequency of the signal into the frequency range of the other band pass filter. Thus, in the case of the second frequency selective channel, the 250 megacycle local oscillator 104 heterodynes the 135 to 200 megacycle band of the high pass sub-channel 101 down to the 50 to 115 megacycle band. The third, fourth, fifth and sixth frequency selective stages 115–118 operate in substantially the same manner as the second frequency selective stage 100. The gating generators of all stages are adjusted or triggered to terminate their gating action before the arrival of the next series of dialing pulses. For this purpose a pulse from timing unit 29 is applied to differential amplifier and gating generator unit 114.

The third stage 115 reduces the 75 megacycle frequency band $df_2$ at the output of the second stage to a 37.5 megacycle frequency band $df_3$. The fourth stage reduces the 37.5 megacycle band supplied to it by the third stage down to a 18.75 megacycle band $df_4$. This process is continued in the fifth and sixth stages. At the input to the sixth stage, the frequency band has been narrowed to a 9.4 megacycle band $df_5$. The output of the sixth channel is narrowed to a 4.7 megacycle band width $df_6$, which is the I.F. band width of the receiver. The output of the sixth stage is then fed to the I.F. amplifiers of the receiver and there amplified and detected to supply the video signals.

As was stated above, the transmitter sends out five dialing pulses prior to the main radar pulse. These dialing pulses plus the transmitted pulse cause the selection of the binary sub-channels of the receiver. The signal level of these pulses can be high compared to the echo pulses and consequently, the differential amplifiers and the video detectors which are used to gate the gated amplifiers can be relatively low gain devices. The differential amplifier will, therefore, not be operated by the echo pulses which come from the antenna. In the manner described, the first dialing pulse selects the proper subchannel of at least the first frequency selective stage. The second dialing pulse is then transmitted through the selected sub-channel of at least the first stage to the next stage and there operates the next stage, which may be the second stage to select the proper sub-channel for the signal. In the same manner, subsequent dialing pulses pass through the previously tuned receiver stages to tune the third, fourth and fifth frequency selective stages. The transmitted radar pulse, or rather a highly attenuated portion thereof, then passes through the duplexer to the input of the receiver and through the first stages, which have been tuned by the dialing pulses, and operates the sixth stage in the manner already described. In this manner, the receiver is pre-tuned to each echo pulse although the frequency of the transmitter changes in a random manner from pulse to pulse. It will be understood that any single dialing pulse may actually tune more than one receiver stage, and hence the above description is only exemplary.

Figure 11:
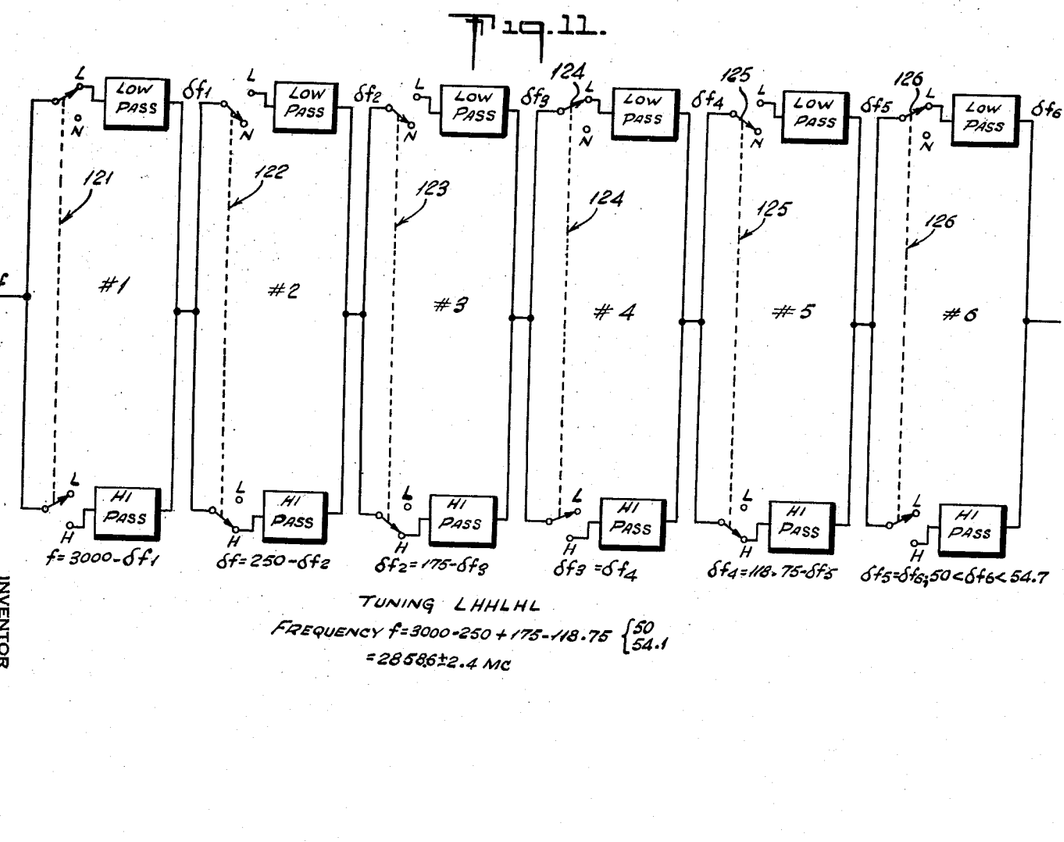
FIG. 11 is a diagram indicating the manner in which different receiver channels are selected by binary switching.

The six stages of the receiver divide the 300 megacycle band of the transmitter into 64 channels, having a band width of approximately 5 megacycles. The 64 possible channels result from the fact that each of the six frequency selected stages is, in effect, a binary switch capable of passing the signal through the high sub-channel or the low sub-channel of each receiver stage. The six channels of the receiver may, therefore, be looked upon as binary coding device for switching or selecting the combination of six sub-channels corresponding to the frequency of the transmitted pulse. The binary switching operation of the six stages #1 to #6 is indicated in FIG. 11, which shows the condition of the six states for receiving a particular frequency, namely, 2858.6±2.4 mc. Each stage is indicated schematically by a pair of double throw switches 121–126 and a high pass and low pass sub-channel connected thereto so that the incoming signal will pass only through one sub-channel or the other, depending upon the position of the switch. In FIG. 11 it is presumed that the signal will pass as indicated by the switches 121–126. The outputs of the several stages are indicated by $df_1$ to $df_6$. The frequency of the incoming signal is $f$. The relationship of the output frequency of each stage to the input frequency is shown by the equation under each stage.

Referring again to FIG. 8, the input of the receiver has a connection 70 to feedback amplifier 71 of the pulse modulator (FIG. 4) through a suitable coupling circuit 130, which may include a video detector. The purpose of this connection, as already explained is to provide negative feedback to driver amplifier 69. Another connection 72 from the output of the No. 5 channel 117 of the receiver to multi-vibrator 73 of the modulator is provided for the purpose of opening feedback loop 70, 71. A coupling circuit 131, which may include a video detector, is inserted in connection 72.

There has now been described an embodiment of the invention in which the receiver is operated in response to a plurality of dial pulses which may be equal in number to the number of selective stages of the receiver. It is possible, however, to operate the receiver very satisfactorily in other ways as well. The number of dialing pulses does not have to be equal to the number of selective stages, for each dialing pulse may effect the gating of several receiver stages provided the amplitude and the duration of the pulse is sufficient. Hence pulse modulator 41 need not generate a full complement of dialing pulses. It may, for example, generate only a single pulse having an extended duration and it will be understood by those skilled in the art that such a single pulse could be used for dialing all the stages of the receiver. Indeed, since all stages of the receiver are in a receiving condition before being dialed, a single pulse of sufficient amplitude at the input of the receiver can tune or gate all of the selective stages of the receiver simultaneously. This single pulse can conveniently be the "main bang" or an adidtional pulse produced by modulator 41. Where the main bang is used for simultaneously switching all selective stages of the receiver, the accelerator electrode of the Carcinotron 30 may be connected to a conventional pulse modulator producing a single pulse during each pulse period. The transmitter circuit is thus greatly simplified. Before being re-tuned to a subsequent pulse, the receiver may be ungated as previously described by supplying a pulse to restore each gating generator of the receiver to the condition permitting transmission through both sub-channels of each receiver stage.

While the receiver has been described particularly with reference to a radar system, the frequency of which is changed in a random manner, it will be apparent that the receiver also lends itself to many other applications. For example the receiver could serve as an intercept receiver which is instantaneously tuned to an intercepted signal and it is capable of fulfilling this function with a minimum number of parts. Further, it may be employed in communication systems and radio relay systems, wherever it is desirable to establish communication automatically at a number of different frequencies, as for example in two way communication systems. Various other applications of the invention and modifications or variations thereof within the scope of the appended claims will be apparent to those skilled in the art.

I claim:

1. A system comprising transmitting means for transmitting radio frequency waves, means for continually varying the frequency of said waves in a random manner and by random amounts over a given frequency band, receiving means for selectively receiving echoes of said waves reflected by distant objects, said receiving means including tuning means for tracking the frequency of said waves, said tuning means comprising a plurality of sets of selective circuits with the circuits of each set having substantially adjacent pass bands, and means responsive to the frequency of said waves for selecting one circuit of each set and interconnecting the selected circuits in cascade to form a selective receiving channel tuned to the frequency of the waves.

2. A system comprising transmitting means for transmitting radio frequency waves, said transmitting means including means for generating sets of pulses of radio frequency oscillations, each set comprising a predetermined number of pulses, means for maintaining the frequency of the radio frequency oscillations of each set of pulses substantially constant and means for continually varying the frequency of said oscillations in a random manner and by random amounts from one set of pulses to the next set of pulses.

3. A radar system comprising means for transmitting pulses of radio frequency energy, means for causing said frequency to vary randomly by a non-predetermined amount from one pulse to the next and a receiver including frequency selective circuit means for selectively receiving echoes of said pulses, said circuit means including a plurality of cascaded stages each having a plurality of discrete resonant frequencies, and means responsive to individual pulses for adjusting each stage to operate at one of its resonant frequencies.

4. A radar system comprising a transmitter of radio frequency energy including a voltage tunable oscillator and means for applying a randomly varying voltage to an electrode of said oscillator for varying the frequency thereof in a random manner and a receiver for receiving reflections of said radio frequency energy from distant objects, said receiver having tuned circuit means including a plurality of cascaded stages each having a plurality of discrete resonant frequencies, and means responsive to the frequency of said received energy for adjusting each stage to operate at one of its resonant frequencies.

5. A system according to claim 4 including means for pulsing the oscillator, the tuning means including means for tuning the tuned circuit means of the receiver to the frequency of each transmitted pulse.

6. A radar system comprising a transmitter of radio frequency energy including a voltage tunable oscillator, means for pulsing said oscillator, means for applying a randomly varying voltage to an electrode of said oscillator for varying the frequency thereof randomly and a receiver for receiving reflections of said radio frequency energy form distant objects, said receiver having tuned circuit means and means for tuning the tuned circuit means to the frequency of each transmitted pulse, said transmitter including means for generating a plurality of dialing pulses of the same frequency as each transmitted pulse and in an interval adjacent to said transmitted pulse, said receiver tuning means being adapted to tune said receiver in response to said dialing pulses.

7. A system according to claim 6, wherein said tuned circuit means includes a plurality of tuned input stages and said receiver tuning means are connected to tune successive one of said stages in response to successive dialing pulses.

8. A radar system comprising a transmitter having an oscillator, means for varying the frequency of the oscillator at predetermined intervals and means for causing said oscillator to produce a predetermined number of pulses during each interval and a receiver having tuned selective circuits and tuning means responsive to said pulses for changing the resonant frequency of said selective circuits for selectively receiving echoes of the transmitted oscillation.

9. An amplifier comprising a plurality of frequency selective stages, each having an output circuit and an input circuit and a pair of sub-channels having different pass bands and being connected to the input circuit of their respective stage, means in each stage responsive to the output of the pair of sub-channels thereof for connecting the input circuit to the output circuit of that stage through only one of the sub-channels, each stage having a narrower pass band than the preceding stages, and means for converting the frequencies of the outputs of the two sub-channels of each stage to a frequency within the pass band of the next stage.

10. A receiver having a plurality of cascaded tuned stages of progressively increasing selectivity, each of said stages comprising a plurality of sub-channels having substantially complementary pass bands and means responsive to a signal frequency for causing a received signal of said frequency to pass through only that sub-channel of each of said cascaded stages having a pass band corresponding to the frequency of the received signal.

11. Binary switching apparatus comprising a receiver having a plurality of frequency selective stages connected in cascade and means for applying signals to said receiver lying within a predetermined number of frequency ranges, each of said stages comprising a pair of parallel connected sub-channels having complementary pass bands, a switching means connected to the sub-channels of each stage so as to be operated in response to signals in one or the other of its respective sub-channels, said switching means being selectively responsive to the frequency range of said signals for establishing a path through all of said stages corresponding to the frequency range of an applied signal.

12. A radio receiver for pulses of high frequency oscillations comprising a plurality of frequency selective stages connected in cascade, each of said stages comprising an input circuit, a pair of sub-channels connected to said input circuit, said sub-channels having substantially complementary pass bands, each sub-channel comprising a band pass filter and a gated amplifier connected in series, a video detector connected to the output of said gated amplifier, a differential amplifier and gating generator connected between the outputs of said video detectors and the gated amplifiers for blocking the gated amplifier having the lesser output, a mixer connected to the output of at least one of said gated amplifiers, a local oscillator connected to said mixer and having a frequency such as to cause one of the outputs of the mixer to lie in substantially the same frequency band as the band pass filter of the other channel, each of said stages having a pass band which is approximately one-half as wide as the pass band of the preceding stage.

13. A receiver having a plurality of frequency selective stages connected in cascade and means for applying signals to said receiver lying within a predetermined number of frequency ranges, each of said stages having a pair of parallel-connected frequency selective sub-channels having complementary pass bands and means responsive to a single pulse of waves within one of said frequency ranges for selecting and operatively interconnecting only one of each pair of said sub-channels so as to establish a path through all of said stages corresponding to the frequency range of said pulse.

14. A receiver according to claim 13, wherein said last named means is responsive to a subsequently occurring pulse to place all said sub-channels in an operative condition.

References Cited by the Examiner
UNITED STATES PATENTS

| | | | |
|---|---|---|---|
| 2,522,367 | 9/50 | Guanella | 343—17.1 |
| 2,664,522 | 12/53 | Page | 343—11 |

CHESTER L. JUSTUS, *Primary Examiner.*

NORMAN H. EVANS, FREDERICK M. STRADER, *Examiners.*